(12) United States Patent
Park

(10) Patent No.: US 12,512,001 B2
(45) Date of Patent: Dec. 30, 2025

(54) METHOD AND SYSTEM FOR DETECTING BLIND SPOT OF VEHICLE

(71) Applicant: HL Klemove Corp., Incheon (KR)

(72) Inventor: Byungjoon Park, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 99 days.

(21) Appl. No.: 18/379,450

(22) Filed: Oct. 12, 2023

(65) Prior Publication Data

US 2025/0022375 A1    Jan. 16, 2025

(30) Foreign Application Priority Data

Jul. 12, 2023    (KR) .................. 10-2023-0090254

(51) Int. Cl.
G08G 1/16 (2006.01)
B60Q 9/00 (2006.01)
G06T 7/11 (2017.01)

(52) U.S. Cl.
CPC ............ *G08G 1/167* (2013.01); *B60Q 9/008* (2013.01); *G06T 7/11* (2017.01); *G06T 2207/30252* (2013.01)

(58) Field of Classification Search
CPC .......... G08G 1/167; B60Q 9/008; G06T 7/11; G06T 2207/30252; B60W 40/02; B60W 50/14; B60W 2050/143; B60W 2420/403; B60W 2554/4048; B60Y 2400/90
See application file for complete search history.

(56) References Cited

U.S. PATENT DOCUMENTS

| | | | |
|---|---|---|---|
| 2017/0291547 A1* | 10/2017 | Lai | ........................ G06V 20/58 |
| 2020/0111368 A1* | 4/2020 | Park | ...................... B60W 40/04 |
| 2024/0092360 A1* | 3/2024 | Niizeki | ............. B60W 30/0956 |

* cited by examiner

*Primary Examiner* — Richard T Torrente
(74) *Attorney, Agent, or Firm* — Hauptman Ham, LLP

(57) ABSTRACT

A method for detecting a blind spot of a vehicle is provided The method for detecting a blind spot of a vehicle includes acquiring a vehicle image around a host vehicle using an image sensor, calculating an overall length and an overall width of a target vehicle included in the vehicle image, and detecting at least one region corresponding to a blind spot of the target vehicle using the overall length and the overall width of the target vehicle when the overall length of the target vehicle is greater than or equal to a predetermined length.

17 Claims, 8 Drawing Sheets

METHOD AND SYSTEM FOR DETECTING BLIND SPOT OF VEHICLE

CROSS-REFERENCE TO RELATED APPLICATION

This application claims priority under 35 U.S.C. § 119 to Korean Patent Application No. 10-2023-0090254, filed on Jul. 12, 2023, in the Korean Intellectual Property Office (KIPO), the disclosure of which is incorporated by reference herein in its entirety.

TECHNICAL FIELD

The present disclosure relates to a method and system for detecting a blind spot of a vehicle, and more particularly, to a method and system for detecting a blind spot of a target vehicle while a host vehicle is driving.

BACKGROUND

Collisions frequently occur due to blind spots of vehicles. In particular, in the case of buses and trucks with large bodies, there is a wide blind spot, and accidents due thereto continuously occur. Therefore, in order to prevent accidents due to such blind spots, various technologies for detecting blind spots or transmitting out warnings have been developed.

Meanwhile, blind spots of vehicles are determined to be different depending on the overall length and the overall width of vehicles. Therefore, it is important to accurately determine the range of blind spots of surrounding vehicles corresponding to the overall length and the overall width of each vehicle. However, it may be difficult to determine in real time the range of the blind spots different depending on the body of each vehicle during driving.

SUMMARY

The present disclosure provides a method for detecting a blind spot of a vehicle, a computer program stored in a computer-readable medium, a computer-readable medium storing the computer program, and a system (device).

The present disclosure may be implemented in a variety of ways, including a method, a system (device), a computer program stored in a computer-readable medium, or a computer-readable medium in which the computer program is stored.

According to embodiments of the present disclosure, a method for detecting a blind spot of a vehicle, performed by at least one processor, includes acquiring a vehicle image around a host vehicle using an image sensor, calculating an overall length and an overall width of a target vehicle included in the vehicle image, and detecting at least one region corresponding to a blind spot of the target vehicle using the overall length and the overall width of the target vehicle when the overall length of the target vehicle is greater than or equal to a predetermined length.

The detecting of at least one region corresponding to a blind spot of the target vehicle using the overall length and the overall width of the target vehicle may include extracting a reference point of the target vehicle and detecting at least one region corresponding to the blind spot of the target vehicle using the overall length and the overall width of the target vehicle based on the extracted reference point.

The detecting of at least one region corresponding to the blind spot of the target vehicle using the overall length and the overall width of the target vehicle based on the extracted reference point may include detecting, as a first region corresponding to the blind spot of the target vehicle, an internal region of a first line passing through the reference point, a second line having a distance of $x_1+l/2$ at a front, a third line having a distance of $x_2+w/2$ on a left, and a fourth line having a distance of $x_2+w/2$ on a right, based on the reference point, wherein l denotes the overall length of the target vehicle, w denotes the full width of the target vehicle, and $x_1$ and $x_2$ have values greater than 0.

The method may further include performing warning control of the host vehicle in response to at least a portion of the host vehicle entering the first region.

The detecting of at least one region corresponding to the blind spot of the target vehicle using the overall length and the overall width of the target vehicle based on the extracted reference point may include detecting, as a second region corresponding to the blind spot of the target vehicle, an internal region of a fifth line having a distance of $x_3$ at a rear, a sixth line having a distance of $x_4+l/2$ at a front, a seventh line having a distance of $x_5+w/2$ on a left, and an eighth line having a distance of $x_5+w/2$ on a right, based on the reference point. Here, $x_3$, $x_4$, and $x_5$ may have values greater than 0, $x_4$ may have a value greater than $x_1$, and $x_5$ may have a value greater than $x_2$.

The method may further include performing warning cancellation control of the host vehicle in response to the entire body of the host vehicle moving out of the second region.

The detecting of at least one region corresponding to the blind spot of the target vehicle using the overall length and the overall width of the target vehicle based on the extracted reference point may include detecting, as a third region corresponding to the blind spot of the target vehicle, an internal region of a ninth line having a distance of l/2 at a rear, a tenth line having a distance of $x_6+l/2$ at the rear, an eleventh line having a distance of $x_7+w/2$ on a left, and a twelfth line having a distance of $x_7+w/2$ on a right, based on the reference point. Here, $x_6$ and $x_7$ may have values greater than 0, and $x_6$ may have a value less than $x_2$.

The method may further include performing warning control of the host vehicle in response to the host vehicle entering the third region and performing warning cancellation control of the host vehicle in response to the entire body of the host vehicle leaving the third region.

A computer program stored in a computer-readable recording medium to execute the method described above in a computer is provided.

According to embodiments of the present disclosure, a system for detecting a blind spot of a vehicle includes an image sensor configured to acquire a vehicle image around a host vehicle and a controller configured to detect at least one region corresponding to a blind spot of a target vehicle included in the vehicle image.

The controller may include a vehicle information calculator configured to calculate an overall length and an overall width of the target vehicle included in the vehicle image, a region detector configured to detect at least one region corresponding to a blind spot of the target vehicle using the overall length and the overall width of the target vehicle calculated by the vehicle information calculator, and a warning transmitter configured to transmit a warning based on a position of the host vehicle relative to the target vehicle.

The region detector may detect at least one region corresponding to the blind spot of the target vehicle when the overall length of the target vehicle is equal to or greater than a predetermined length.

The region detector may extract a reference point of the target vehicle and detects at least one region corresponding to the blind spot of the target vehicle using the overall length and the overall width of the target vehicle based on the extracted reference point.

The region detector may detect, as a first region corresponding to the blind spot of the target vehicle, an internal region of a first line passing through the reference point, a second line having a distance of $x_1+l/2$ at a front, a third line having a distance of $x_2+w/2$ on a left, and a fourth line having a distance of $x_2+w/2$ on a right, based on the reference point. Here, l may denote the overall length of the target vehicle, w may denote the full width of the target vehicle, and $x_1$ and $x_2$ may have values greater than 0.

The warning transmitter may perform warning control of the host vehicle in response to at least a portion of the host vehicle entering the first region.

The region detector may detect, as a second region corresponding to the blind spot of the target vehicle, an internal region of a fifth line having a distance of $x_3$ at a rear, a sixth line having a distance of $x_4+l/2$ at a front, a seventh line having a distance of $x_5+w/2$ on a left, and an eighth line having a distance of $x_5+w/2$ on a right, based on the reference point. Here, $x_3$, $x_4$, and $x_5$ may have values greater than 0, $x_4$ may have a value greater than $x_1$, and $x_5$ may have a value greater than $x_2$.

The warning transmitter may perform warning cancellation control of the host vehicle in response to the entire body of the host vehicle moving out of the second region.

The region detector may detect, as a third region corresponding to the blind spot of the target vehicle, an internal region of a ninth line having a distance of l/2 at a rear, a tenth line having a distance of $x_6+l/2$ at the rear, an eleventh line having a distance of $x_7+w/2$ on a left, and a twelfth line having a distance of $x_7+w/2$ on a right, based on the reference point. Here, $x_6$ and $x_7$ may have values greater than 0, and $x_6$ may have a value less than $x_2$.

The warning transmitter may perform warning control of the host vehicle in response to the host vehicle entering the third region, and perform warning cancellation control of the host vehicle in response to the entire body of the host vehicle leaving the third region.

In various embodiments of the present disclosure, the vehicle system may allow a host vehicle other than a target vehicle to recognize a blind spot of the target vehicle to induce a collision between vehicles to be avoided in advance.

In various embodiments of the present disclosure, the vehicle system may efficiently detect a blind spot of the target vehicle adjacent to the host vehicle according to the overall length and the overall width during driving. In addition, the vehicle system may effectively perform warning and warning cancellation operations according to a risk of collision by dividing the blind spot of the target vehicle into a plurality of regions, instead of one region, and detecting the same.

In various embodiments of the present disclosure, the blind spot of the target vehicle is divided into a plurality of regions (e.g., a first region and a second region) according to a risk of collision and warning control is performed according to a behavior of the host vehicle in each region, thereby effectively preventing accidents between vehicles due to the blind spot.

The effects of the present disclosure are not limited to the effects mentioned above, and other effects not mentioned may be clearly understood by those skilled in the art (referred to as "ordinary people in the art") from the description of the claims.

DETAILED DESCRIPTION

Figure 1:
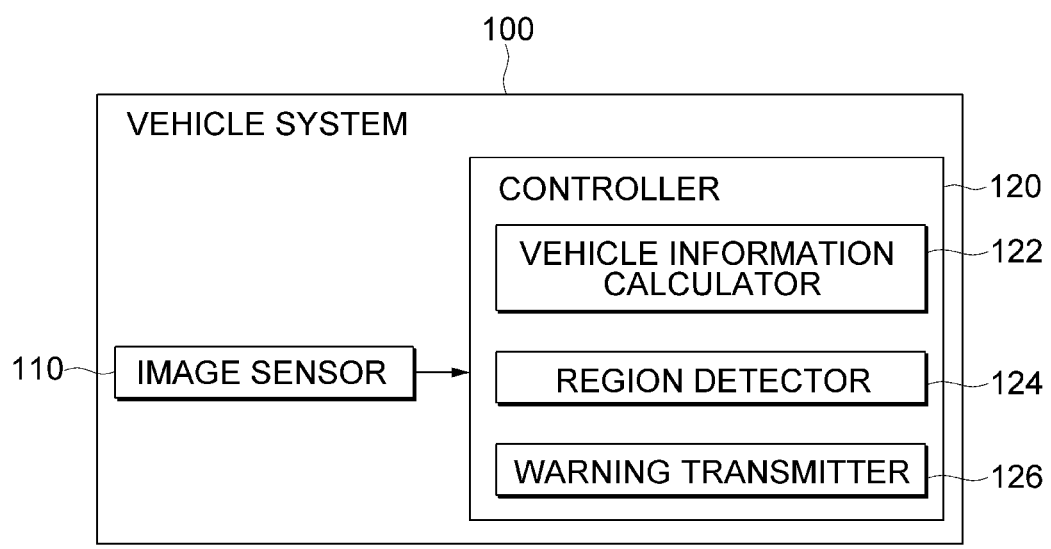
FIG. 1 is a functional block diagram illustrating an internal configuration of a vehicle system according to an embodiment of the present disclosure.

Hereinafter, specific details for the implementation of the present disclosure will be described in detail with reference to the accompanying drawings. However, in the following description, if there is a risk of unnecessarily obscuring the gist of the present disclosure, detailed descriptions of well-known functions or configurations will be omitted.

In the accompanying drawings, identical or corresponding elements are given the same reference numerals. In addition, in the description of the following embodiments, overlapping descriptions of the same or corresponding components may be omitted. However, omission of a description of a component does not intend that such a component is not included in an embodiment.

Advantages and features of the present disclosure and a method of achieving the advantages and features of the present disclosure will be clearly understood from embodiments described hereinafter in conjunction with the accompanying drawings. However, the present disclosure is not limited to the following embodiments and may be realized in various different forms. These embodiments are provided only to completely disclose the present disclosure and for a person having ordinary skill in the art to which the present disclosure pertains to completely understand the category of the disclosure.

Terms to be used in the following embodiments will hereinafter be described in detail, and a detailed description of embodiments is as follows. Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

As used herein, the singular forms "a," "an," and "the" may be intended to include the plural forms as well, unless the context clearly indicates otherwise. Terms used in the following description are used only to describe the specific embodiments and are not intended to restrict the present disclosure. A singular expression may include a plural expression unless otherwise stated in context.

In the present disclosure, the terms "include," "including" and the like may indicate that features, steps, operations, elements and/or components are present, but such terms do not preclude the addition of one or more other functions, steps, operations, elements, components and/or combinations thereof.

In the present disclosure, when a specific component is referred to as "coupling," "combining," "connecting," or "reacting" to any other component, the specific component may be directly coupled to, combined with, and/or connected to, or reacted with other components, but is not limited thereto. For example, one or more intermediate components may exist between certain components and other components. Also, in the present disclosure, "and/or" may include each of one or more items listed or a combination of at least a some of one or more items.

In the present disclosure, terms, such as "first" and "second" are used to distinguish a specific component from other components, and the aforementioned components are not limited by these terms. For example, a "first" component may have the same or similar shape as a "second" component.

In the present disclosure, a "blind spot" may refer to a region in which a driver riding in a vehicle cannot identify an adjacent object or the like due to an obstacle.

FIG. 1 is a functional block diagram illustrating an internal configuration of a vehicle system 100 according to an embodiment of the present disclosure. As shown, the vehicle system 100 refers to any system for controlling or driving a vehicle, and may include an image sensor 110 and a controller 120, but is not limited thereto. In addition, the controller 120 is illustrated as including a vehicle information calculator 122, a region detector 124, a warning transmitter 126, and the like, but is not limited thereto.

The vehicle system 100 may detect a blind spot of another vehicle (e.g., a target vehicle) around a host vehicle while the host vehicle is driving. In this case, the blind spot of the target vehicle may refer to a region formed based on the target vehicle. According to an embodiment, the vehicle system 100 may acquire a vehicle image including a vehicle around the host vehicle using the image sensor 110 and identify the target vehicle included in the vehicle image. Thereafter, the vehicle system 100 may detect the blind spot of the identified target vehicle. Here, the image sensor 110 may refer to a camera sensor and/or a radar sensor.

According to an embodiment, the vehicle system 100 may detect a blind spot of the target vehicle when the overall length of the identified target vehicle is greater than or equal to a predetermined length. That is, the vehicle system 100 may determine whether the identified target vehicle is a large vehicle with a large blind spot, and detect the blind spot of the corresponding target vehicle only when the target vehicle is a large vehicle.

To this end, the vehicle information calculator 122 of the controller 120 may calculate the overall length and overall width of the target vehicle included in the vehicle image. For example, the overall length and the overall width of the target vehicle may be calculated based on a distance between the target vehicle included in the vehicle image and the host vehicle and the size of the target vehicle (the size on the image), but is not limited thereto. In another example, the vehicle image acquired by the image sensor 110 may be converted into a top-view image, and the overall length and the overall width of the target vehicle may also be calculated based on the converted top-view image.

Thereafter, when the overall length of the target vehicle is greater than or equal to the predetermined length, the vehicle system 100 may detect at least one region corresponding to the blind spot of the target vehicle using the overall length and the overall width of the target vehicle. For example, the region detector 124 of the controller 120 may extract a reference point of the target vehicle and detect at least one region corresponding to the blind spot of the target vehicle using the overall length and the overall width of the target vehicle based on the extracted reference point. Here, the reference point of the target vehicle may be determined as the center of the target vehicle.

According to an embodiment, at least one region corresponding to the blind spot of the target vehicle may be determined as an internal region of a plurality of lines determined based on the reference point. That is, when the reference point of the target vehicle is determined, the region detector 124 may generate a plurality of lines based on the reference point of the target vehicle and detect the internal regions of the plurality of generated lines as at least one region corresponding to the blind spot of the target vehicle. With this configuration, the region detector 124 may detect in real time the region of the blind spot determined to be different depending on the overall length and overall width of the target vehicle.

After the blind spot of the target vehicle is detected, the warning transmitter 126 of the controller 120 may perform warning control or warning cancellation control according to a behavior of the host vehicle. According to an embodiment, the warning transmitter 126 may issue a warning when the host vehicle enters a collision risk region (e.g., a first region or a third region), and may cancel the warning when the host vehicle moves out of a boundary region (e.g., a second region). For example, when the host vehicle enters the collision risk region, the warning transmitter 126 may activate a warning icon on an outside mirror of the host vehicle, output a warning sound, or display a warning message on a cluster, and when the host vehicle moves out of a collision boundary region, the warning transmitter 126 may cancel the warning.

Although each functional component included in the vehicle system 100 is separately described in FIG. 1, this is only to help understanding of the present disclosure, and one arithmetic device may perform two or more functions. With this configuration, the vehicle system 100 may induce the host vehicle, not the target vehicle, to recognize the blind spot of the target vehicle, thereby avoiding a collision between vehicles in advance.

Figure 2:
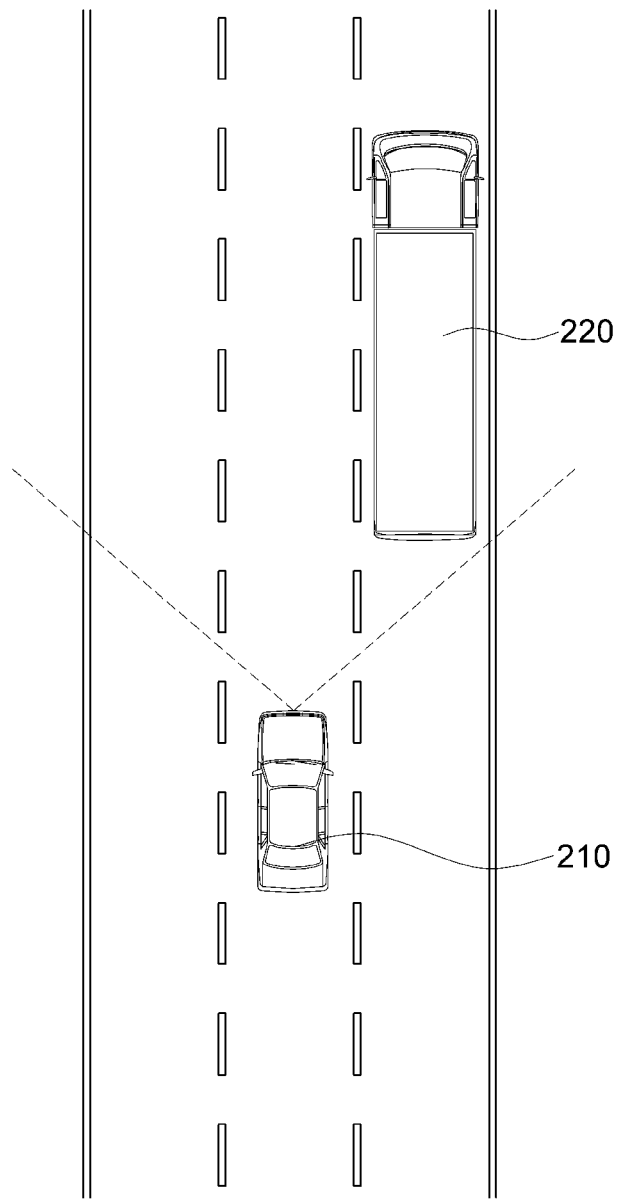
FIG. 2 is a diagram illustrating an example of acquiring a vehicle image including a target vehicle by a host vehicle according to an embodiment of the present disclosure.

FIG. 2 is a diagram illustrating an example in which the host vehicle 210 acquires a vehicle image including the target vehicle 220 according to an embodiment of the present disclosure. As described above, the host vehicle (or the vehicle system 100 of the host vehicle) 210 may acquire a vehicle image around the host vehicle by using an image sensor during driving. For example, the host vehicle 210 may acquire a vehicle image including a target vehicle 220 using an image sensor including a camera sensor and/or a radar sensor.

As shown, when the target vehicle 220 is located in front of the host vehicle 210, the host vehicle 210 may acquire a vehicle image using an image sensor, but is not limited thereto. For example, the host vehicle 210 may include a plurality of image sensors for identifying front and/or rear objects, and the host vehicle 210 may acquire a vehicle image using the image sensor even when the target vehicle 220 is behind the host vehicle 210.

Figure 3:
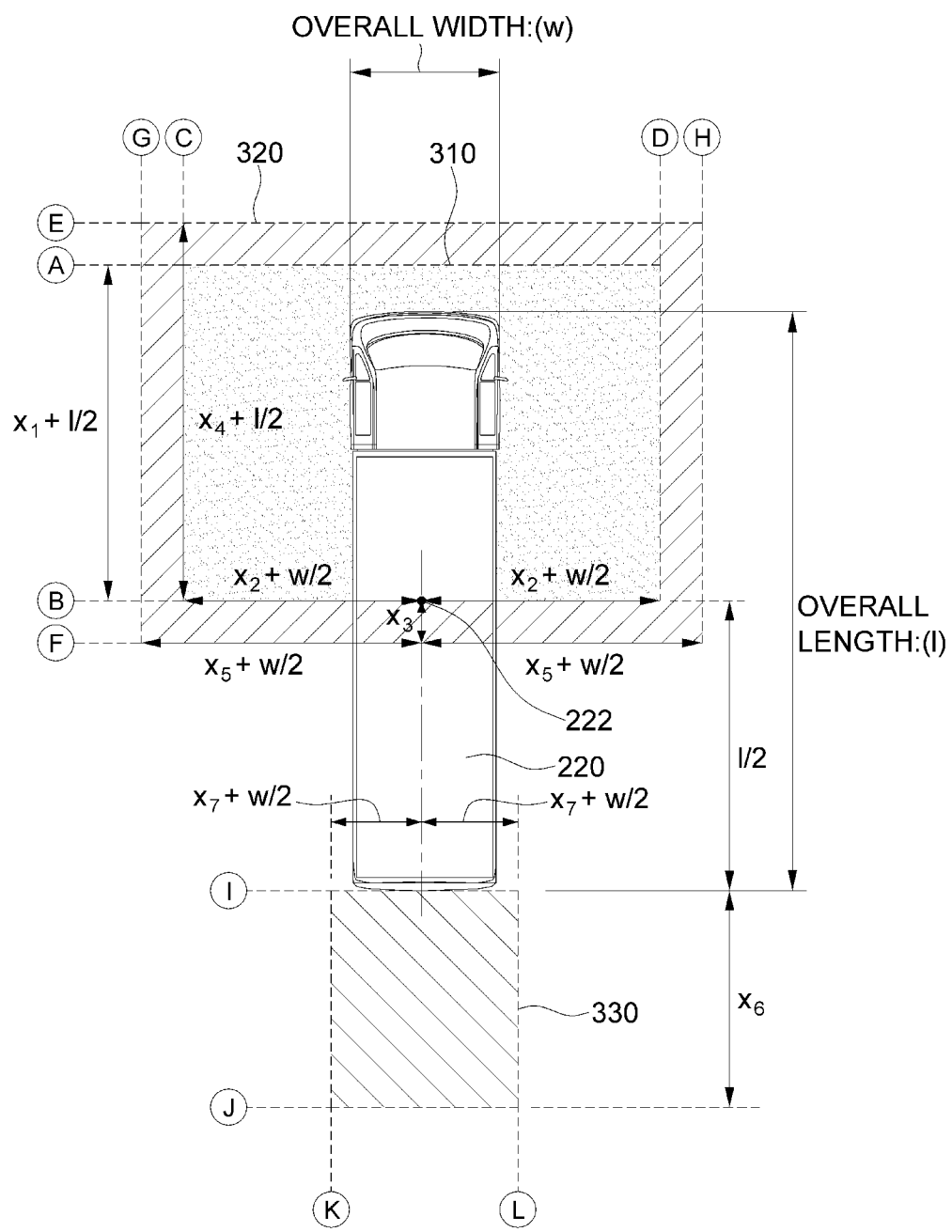
FIG. 3 is a diagram illustrating an example in which a blind spot of a target vehicle is detected according to an embodiment of the present disclosure.

FIG. 3 is a diagram illustrating an example of detecting a blind spot of the target vehicle 220 according to an embodiment of the present disclosure. As described above, the vehicle system (100 in FIG. 1) may extract a reference point 222 of the target vehicle 220 and detect at least one region corresponding to the blind spot of the target vehicle 220 using an overall length l and an overall width w of the target vehicle 220 based on the extracted reference point 222.

In the illustrated example, the vehicle system may detect, as a first region, a quadrangular internal region formed by line A, line B, line C, and line D. For example, the vehicle system may detect, as the first region corresponding to the blind spot of the target vehicle 220, the internal region of a first line (line B) passing through the reference point 222, a second line (line A) having a distance of $x_1+l/2$ at the front, a third line (line C) having a distance of $x_2+w/2$ on the left, and a fourth line (line D) having a distance of $x_2+w/2$ at the right, based on the reference point 222. Here, $x_1$ and $x_2$ may have values greater than 0, and $x_1$ and $x_2$ may be predetermined values or values relatively determined depending on the overall width and the overall length. The first region detected thusly is a front region of the target vehicle 220 and may represent a region with a high risk of collision between the host vehicle and the target vehicle 220.

Additionally, the vehicle system may detect, as the second region, a quadrangular internal region formed by line E, line F, line G, and line H. As shown, the second region may be configured to include the first region. For example, the vehicle system may detect, as the second region corresponding to the blind spot of the target vehicle 220, the internal region of a fifth line (line F) having a distance of $x_3$ at the rear, a sixth line (line E) having a distance of $x_4+l/2$ at the front, a seventh line (line G) having a distance of $x_5+w/2$ on the left, and an eighth line (line H) having a distance of $x_5+w/2$ on the right, based on the reference point 222. Here, $x_3$, $x_4$, and $x_5$ may have a value greater than 0, $x_4$ may have a value greater than $x_1$, $x_5$ may have a value greater than $x_2$, and $x_3$, $x_4$, and $x_5$ may be predetermined values or may be values relatively determined depending on the overall width and the overall length. That is, the second region may be a region including the first region and may represent a boundary region for distinguishing the blind spot from a non-blind spot.

Additionally and/or alternatively, the vehicle system may detect, as the third region, a quadrangular internal region formed by line I, line J, line K, and line L. For example, the vehicle system may detect, as a third region corresponding to a blind spot of the target vehicle 220, an internal region of a ninth line (line I) having a distance of $l/2$ at the rear, a tenth line (line J) having a distance of $x_6+l/2$ at the rear, an eleventh line (line K) having a distance of $x_7+w/2$ on the left, and a twelfth line (line L) having a distance of $x_7+w/2$ on the right, based on the reference point 222. Here, $x_6$ and $x_7$ may have values greater than 0, $x_6$ may have a value less than $x_2$, and $x_6$ and $x_7$ may be predetermined values or values relatively determined depending the overall width and the overall length. That is, the third region may be a rear region of the target vehicle 220 and may represent a region with a high risk of collision between the host vehicle and the target vehicle 220.

With this configuration, the vehicle system may efficiently detect the blind spot of the target vehicle 220 adjacent to the host vehicle according to the overall length and the overall width during driving. In addition, the vehicle system may effectively perform a warning and a warning cancellation operation according to the risk of collision by dividing the blind spot of the target vehicle 220 into a plurality of regions, instead of a single region, and detecting the same.

Figure 4:
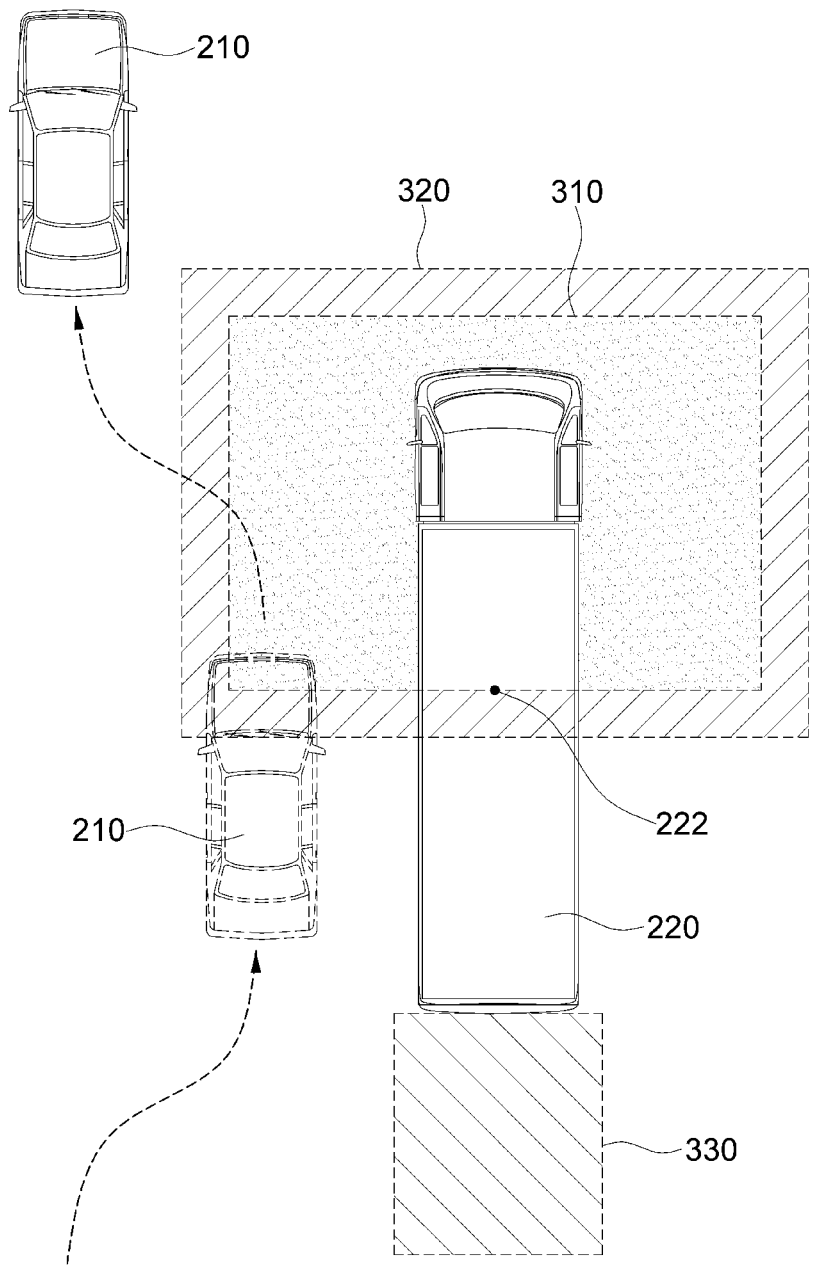
FIG. 4 is a diagram illustrating a behavior of a host vehicle in a first region and a second region according to an embodiment of the present disclosure.

FIG. 4 is a diagram illustrating a behavior of the host vehicle 210 in a first region 310 and a second region 320 according to an embodiment of the present disclosure. As shown, after entering the first region 310 of the blind spot of the target vehicle 220 during driving, the host vehicle 210 may leave the second region 320. In this case, warning control and/or warning cancellation control may be performed according to the vehicle 210 entering and leaving the first region 310 and/or the second region 320.

According to an embodiment, warning control of the host vehicle 210 may be performed in response to at least a portion of the host vehicle 210 entering the first region 310. For example, when at least a portion of the host vehicle 210 enters the first region 310, a warning icon may be activated on the outside mirror of the host vehicle 210, a warning sound may be output, or a warning message may be displayed on the cluster. That is, when the host vehicle 210 enters the first region 310 with a high risk of collision with the target vehicle 220, a warning may be transmitted to the driver of the host vehicle 210.

According to an embodiment, after the host vehicle 210 enters the first region 310 and then moves out of the second region 320, warning cancellation control of the host vehicle 210 may be performed. For example, when the entire body of the host vehicle 210 moves out of the second region 320 representing a boundary point of the blind spot, a warning icon on the outside mirror may be deactivated, a warning sound may be stopped, or a warning message displayed on the cluster may disappear.

With this configuration, the blind spot of the target vehicle 220 may be divided into a plurality of regions (e.g., the first region 310 and the second region 320) according to the risk of collision and a warning control may be performed according to a behavior of the host vehicle 210 in each region, thereby effectively preventing a collision accident between vehicles due to a blind spot.

Figure 5:
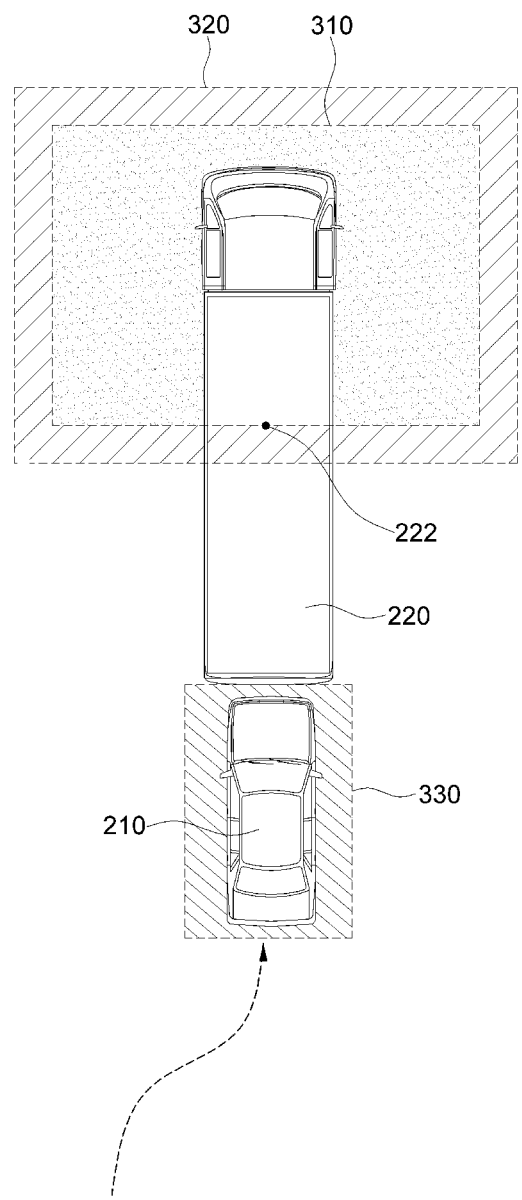
FIG. 5 is a diagram illustrating a behavior of a host vehicle in a third region according to an embodiment of the present disclosure.

FIG. 5 is a diagram illustrating a behavior of the host vehicle 210 in a third region 330 according to an embodiment of the present disclosure. As shown, the host vehicle 210 may enter the third region 330 of the blind spot of the target vehicle 220 during driving. In this case, warning control and/or warning cancellation control may be performed as the host vehicle 210 enters and leaves the third region 330.

According to an embodiment, warning control of the host vehicle 210 may be performed in response to the host vehicle 210 entering the third region 330. For example, when the entire body of the host vehicle 210 enters the third region 330, a warning icon may be activated on the outside mirror of the host vehicle 210, a warning sound may be output, or a warning message may be displayed on the cluster. That is, when the host vehicle 210 enters the third region 330 with a high risk of collision with the target vehicle 220, a warning may be transmitted to the driver of the host vehicle 210.

According to an embodiment, in response to the host vehicle 210 moving out of the third region 330, warning cancellation control of the host vehicle 210 may be performed. For example, when the entire body of the host vehicle 210 moves out of the third region 330 indicating a rear blind spot of the target vehicle 220, the warning icon on the outside mirror may be deactivated, the warning sound may be stopped, or the warning message displayed on the cluster may disappear.

Figure 6:
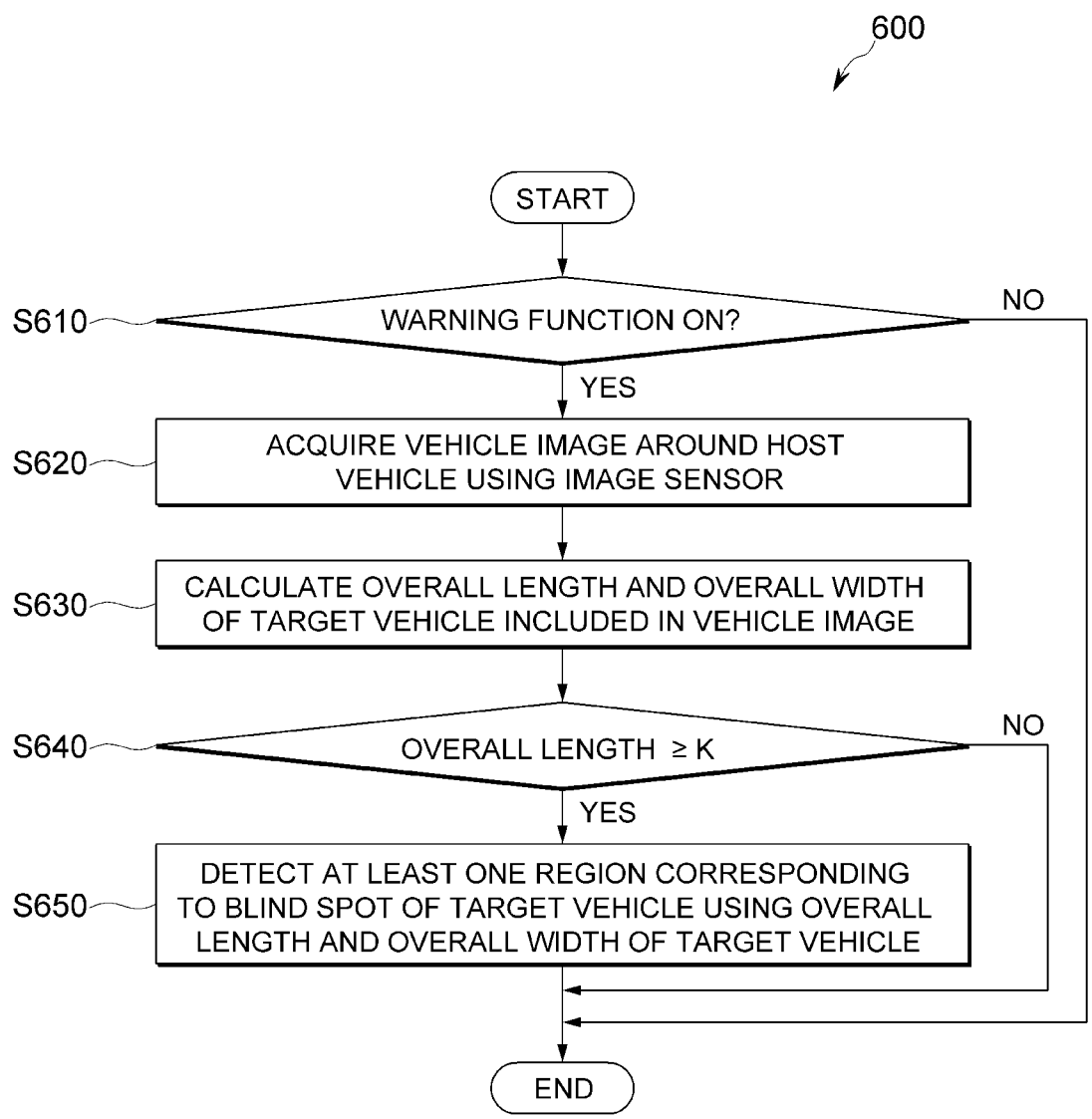
FIG. 6 is a flowchart illustrating a method for detecting a blind spot of a vehicle according to an embodiment of the present disclosure.

FIG. 6 is a flowchart illustrating a method 600 for detecting a blind spot of a vehicle according to an embodiment of the present disclosure. The method 600 of detecting a blind spot of a vehicle may be performed by at least one processor (e.g., at least one processor of a vehicle system). The method 600 for detecting a blind spot of a vehicle may be initiated by a processor determining whether a warning function is turned on (S610). For example, when an ignition (IGN) signal of the vehicle is ON, it may be determined that the warning function is ON. In this manner, when it is determined that the warning function is ON, the processor may acquire a vehicle image around the host vehicle using an image sensor (S620).

The processor may calculate the overall length and the overall width of the target vehicle included in the vehicle image (S630). For example, the processor may calculate the overall length and the overall width of the target vehicle based on a distance between the target vehicle included in the vehicle image and the host vehicle and the size of the target vehicle, but is not limited thereto. In another example, the processor may convert the vehicle image acquired by the image sensor 110 into a top-view image and calculate the overall length and the overall width of the target vehicle based on the converted top-view image.

According to an embodiment, the processor may determine whether the overall length of the target vehicle is equal to or greater than K (e.g., 6 m) (S640). That is, the processor may determine whether the target vehicle is a large vehicle, such as a bus or a truck. When the overall length of the target vehicle is equal to or greater than K, the processor may detect at least one region corresponding to the blind spot of the target vehicle using the overall length and the overall width of the target vehicle (S650). For example, the processor may extract a reference point of the target vehicle and detect at least one region corresponding to the blind spot of the target vehicle by using the overall length and the overall width of the target vehicle based on the extracted reference point.

According to an embodiment, the processor may detect, as a first region corresponding to the blind spot of the target vehicle, an internal region of a first line passing through the reference point, a second line having a distance of $x_1+1/2$ at the front, a third line having a distance of $x_2+w/2$ on the left, and a fourth line having a distance of $x_2+w/2$ on the right, based on the reference point. Additionally, the processor may detect, as a second region corresponding to the blind spot of the target vehicle, an internal region of a fifth line having a distance of $x_3$ at the rear, a sixth line having a distance of $x_4+1/2$ at the front, a seventh line having a distance of $x_5+w/2$ on the left, and an eighth line having a distance of $x_5+w/2$ on the right, based on the reference point. Additionally or alternatively, the processor may detect, as a third region corresponding to the blind spot of the target vehicle, an internal region of a ninth line having a distance of $l/2$ at the rear, a tenth line having a distance of $x_6+1/2$ at the rear, an eleventh line having a distance of $x_7+w/2$ on the left, and a twelfth line having a distance of $x_7+w/2$ on the right, based on the reference point.

Figure 7:
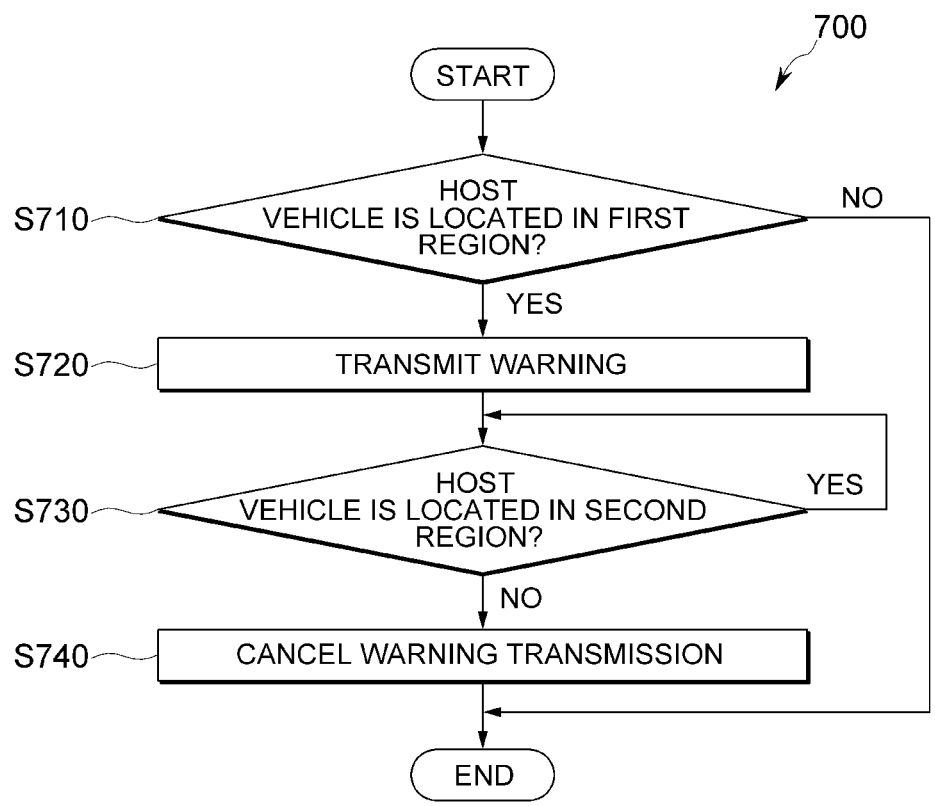
FIG. 7 is a flowchart illustrating a method of transmitting a warning in a first region and a second region according to an embodiment of the present disclosure.

FIG. 7 is a flowchart illustrating a method 700 for transmitting a warning (or a warning transmission method) in a first region and a second region according to an embodiment of the present disclosure. The warning transmission method 700 may be performed by at least one processor (e.g., at least one processor of a vehicle system). The warning transmission method 700 may be initiated by the processor determining whether at least a portion of the host vehicle is located in the first region (S710).

When it is determined that at least a portion of the host vehicle is located in the first region, the processor may transmit a warning (S720). Thereafter, the processor may determine whether the host vehicle is located in the second region (S730). When it is determined that the entire body of the host vehicle is out of the second region, the processor may cancel a warning transmission (S740).

Figure 8:
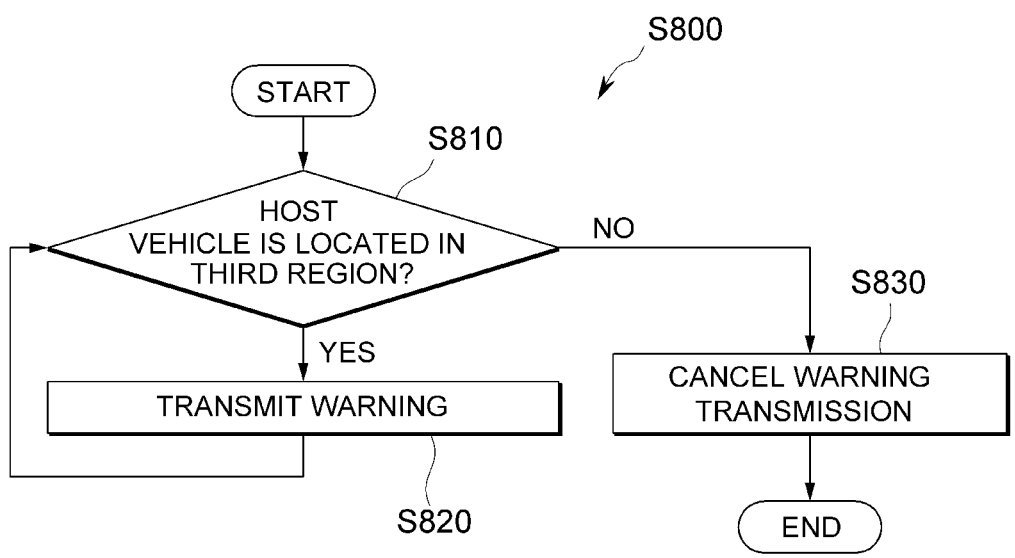
FIG. 8 is a flowchart illustrating a method for transmitting a warning in a third region according to an embodiment of the present disclosure.

FIG. 8 is a flowchart illustrating a method 800 for transmitting a warning (or a warning tranasmission method 800) in a third region according to an embodiment of the present disclosure. The warning transmission method 800 may be performed by at least one processor (e.g., at least one processor of a vehicle system). The warning transmission method 800 may be initiated by the processor determining whether the entire body of the host vehicle is located in the third region (S810).

When it is determined that the host vehicle is located in the third region, the processor may transmit a warning (S820). Thereafter, when it is determined that the entire body of the host vehicle is out of the third region, the processor may cancel the transmitting of the warning (S830).

The aforementioned methods and/or various embodiments may be realized by digital electronic circuits, computer hardware, firmware, software, and/or combinations thereof. Various embodiments of the present disclosure may be implemented by a data processing device, for example, one or more programmable processors and/or one or more computing devices or by a computer-readable recording medium and/or a computer program stored in the computer-readable recording medium. The aforementioned computer program may be written in any form of programming language, including compiled or interpreted languages, and may be distributed in any form, such as a stand-alone program, module, or subroutine. The computer program may be distributed over one computing device, multiple computing devices connected through the same network, and/or multiple computing devices distributed to be connected through multiple different networks.

The methods and/or various embodiments described above may be performed by one or more processors configured to execute one or more computer programs that process, store, and/or manage certain functions, functions, or the like, by operating based on input data or generating output data. For example, the method and/or various embodiments of the present disclosure may be performed by a special purpose logic circuit, such as a field programmable gate array (FPGA) or an application specific integrated circuit (ASIC), and a device and/or system for performing the method and/or embodiments of the present disclosure may be implemented as a special purpose logic circuit, such as an FPGA or an ASIC.

One or more processors executing the computer program may include a general purpose or special purpose microprocessor and/or one or more processors of any kind of digital computing device. The processor may receive instructions and/or data from each of a read-only memory and a random access memory or receive instructions and/or data from the read-only memory and the random access memory. In the present disclosure, components of a computing device performing methods and/or embodiments may include one or more processors for executing instructions and one or more memory devices for storing instructions and/or data.

According to an embodiment, a computing device may exchange data with one or more mass storage devices for storing data. For example, the computing device may receive data from and/or transfer data to a magnetic or optical disc. A computer-readable storage medium suitable for storing instructions and/or data related to a computer program may include, but is not limited to, any type of non-volatile memory, including semiconductor memory devices, such as erasable programmable read-only memory (EPROM), electrically erasable PROM (EEPROM), and a flash memory device. For example, the computer-readable storage medium may include magnetic disks, such as internal hard disks or removable disks, magneto-optical disks, CD-ROM and DVD-ROM disks.

To provide interaction with a user, a computing device may include, but is not limited to, a display device (e.g., a cathode ray tube (CRT), a liquid crystal display (LCD), etc.) for providing information to a user or displaying information, and a pointing device (e.g., a keyboard, a mouse, a trackball, etc.) through which a user may provide input and/or commands, etc., on the computing device. That is, the computing device may further include any other types of devices for providing interaction with a user. For example, the computing device may provide any form of sensory feedback including visual feedback, auditory feedback, and/or tactile feedback to a user for interaction with the user. In this regard, the user may provide input to the computing device through various gestures, such as sight, voice, and motion.

In the present disclosure, various embodiments may be implemented in a computing system including a back-end component (e.g., a data server), a middleware component (e.g., an application server), and/or a front-end component. In this case, the components may be interconnected by any form or medium of digital data communication, such as a communication network. For example, the communication network may include a local region network (LAN), a wide region network (WAN), and the like.

A computing device based on the example embodiments described herein may be implemented using hardware and/or software configured to interact with a user, including a user device, user interface (UI) device, a user terminal, or a client device. For example, the computing device may include a portable computing device, such as a laptop computer. Additionally or alternatively, the computing device may include, but are not limited to, personal digital assistants (PDAs), tablet PCs, game consoles, wearable devices, internet of things (IoT) devices, virtual reality (VR) devices, augmented reality (AR) devices, and the like. The computing device may further include other types of devices configured to interact with a user. Further, the computing device may include a portable communication device (e.g., a mobile phone, a smartphone, a wireless cellular phone, etc.) suitable for wireless communication over a network, such as a mobile communication network. The computing device may be configured to communicate wirelessly with a network server using wireless communication technologies and/or protocols, such as radio frequency (RF), microwave frequency (MWF), and/or infrared ray frequency (IRF).

The various embodiments herein, including specific structural and functional details, are examples. Accordingly, the embodiments of the present disclosure are not limited to those described above and may be implemented in various other forms. In addition, terms used in the present disclosure are for describing some embodiments and are not construed as limiting the embodiments. For example, the singular and the above may be construed to include the plural as well, unless the context clearly dictates otherwise.

In the present disclosure, unless defined otherwise, all terms used in this specification, including technical or scientific terms, have the same meaning as commonly understood by a person of ordinary skill in the art to which such concept belongs. In addition, terms commonly used, such as terms defined in a dictionary, should be interpreted as having a meaning consistent with the meaning in the context of the related technology.

Although the present disclosure has been described in relation to some embodiments in this specification, various modifications and changes may be made without departing from the scope of the present disclosure that may be understood by those skilled in the art. Moreover, such modifications and variations are intended to fall within the scope of the claims appended hereto.

What is claimed is:

1. A method for detecting a blind spot of a vehicle, performed by at least one processor, the method comprising:
   acquiring a vehicle image around a host vehicle using an image sensor;
   calculating an overall length and an overall width of a target vehicle included in the vehicle image; and
   detecting at least one region corresponding to a blind spot of the target vehicle using the overall length and the overall width of the target vehicle when the overall length of the target vehicle is greater than or equal to a predetermined length,
   wherein the detecting of at least one region corresponding to the blind spot of the target vehicle using the overall length and the overall width of the target vehicle includes:
      extracting a reference point of the target vehicle; and
      detecting at least one region corresponding to the blind spot of the target vehicle using the overall length and the overall width of the target vehicle based on the extracted reference point,
   wherein the detecting of at least one region corresponding to the blind spot of the target vehicle using the overall length and the overall width of the target vehicle based on the extracted reference point includes:
      detecting, as a first region corresponding to the blind spot of the target vehicle, an internal region of a first line passing through the reference point, a second line having a distance of $x_1+l/2$ at a front, a third line having a distance of $x_2+w/2$ on a left, and a fourth line having a distance of $x_2+w/2$ on a right, based on the reference point, and
   wherein l denotes the overall length of the target vehicle, w denotes the full width of the target vehicle, and $x_1$ and $x_2$ have values greater than 0.

2. The method of claim 1, further comprising:
   performing warning control of the host vehicle in response to at least a portion of the host vehicle entering the first region.

3. The method of claim 1, wherein
   the detecting of at least one region corresponding to the blind spot of the target vehicle using the overall length and the overall width of the target vehicle based on the extracted reference point includes:

detecting, as a second region corresponding to the blind spot of the target vehicle, an internal region of a fifth line having a distance of $x_3$ at a rear, a sixth line having a distance of $x_4+l/2$ at a front, a seventh line having a distance of $x_5+w/2$ on a left, and an eighth line having a distance of $x_5+w/2$ on a right, based on the reference point, wherein $x_3$, $x_4$, and $x_5$ have values greater than 0, $x_4$ has a value greater than $x_1$, and $x_5$ has a value greater than $x_2$.

4. The method of claim 3, further comprising:

performing warning cancellation control of the host vehicle in response to the entire body of the host vehicle moving out of the second region.

5. The method of claim 1, wherein the detecting of at least one region corresponding to the blind spot of the target vehicle using the overall length and the overall width of the target vehicle based on the extracted reference point includes:

detecting, as a third region corresponding to the blind spot of the target vehicle, an internal region of a ninth line having a distance of $l/2$ at a rear, a tenth line having a distance of $x_6+l/2$ at the rear, an eleventh line having a distance of $x_7+w/2$ on a left, and a twelfth line having a distance of $x_7+w/2$ on a right, based on the reference point, wherein $x_6$ and $x_7$ have values greater than 0, and $x_6$ has a value less than $x_2$.

6. The method of claim 5, further comprising:

performing warning control of the host vehicle in response to the host vehicle entering the third region and performing warning cancellation control of the host vehicle in response to the entire body of the host vehicle leaving the third region.

7. A non-transitory computer-readable recording medium storing instructions for execution by one or more processors that, when executed by the one or more processors, cause the one or more processors to perform the method according to claim 1.

8. The method of claim 1, wherein the calculating an overall length and an overall width of a target vehicle included in the vehicle image includes:

calculating the overall length and the overall width of the target vehicle based on a distance between the target vehicle included in the vehicle image and the host vehicle and a size of the target vehicle.

9. The method of claim 1, wherein the calculating an overall length and an overall width of a target vehicle included in the vehicle image includes:

converting the vehicle image into a top-view image; and calculating the overall length and the overall width of the target vehicle based on the top-view image.

10. A system for detecting a blind spot of a vehicle, the system comprising:

an image sensor configured to acquire a vehicle image around a host vehicle; and a controller configured to detect at least one region corresponding to a blind spot of a target vehicle included in the vehicle image, wherein the controller includes:

a vehicle information calculator configured to calculate an overall length and an overall width of the target vehicle included in the vehicle image;

a region detector configured to detect at least one region corresponding to the blind spot of the target vehicle using the overall length and the overall width of the target vehicle calculated by the vehicle information calculator; and a warning transmitter configured to transmit a warning based on a position of the host vehicle relative to the target vehicle, wherein the region detector detects at least one region corresponding to the blind spot of the target vehicle when the overall length of the target vehicle is equal to or greater than a predetermined length, wherein the region detector extracts a reference point of the target vehicle and detects at least one region corresponding to the blind spot of the target vehicle using the overall length and the overall width of the target vehicle based on the extracted reference point, and wherein the region detector detects, as a first region corresponding to the blind spot of the target vehicle, an internal region of a first line passing through the reference point, a second line having a distance of $x_1+l/2$ at a front, a third line having a distance of $x_2+w/2$ on a left, and a fourth line having a distance of $x_2+w/2$ on a right, based on the reference point, and wherein l denotes the overall length of the target vehicle, w denotes the full width of the target vehicle, and $x_1$ and $x_2$ have values greater than 0.

11. The system of claim 10, wherein the warning transmitter performs warning control of the host vehicle in response to at least a portion of the host vehicle entering the first region.

12. The system of claim 10, wherein the region detector detects, as a second region corresponding to the blind spot of the target vehicle, an internal region of a fifth line having a distance of $x_3$ at a rear, a sixth line having a distance of $x_4+l/2$ at a front, a seventh line having a distance of $x_5+w/2$ on a left, and an eighth line having a distance of $x_5+w/2$ on a right, based on the reference point, wherein $x_3$, $x_4$, and $x_5$ have values greater than 0, $x_4$ has a value greater than $x_1$, and $x_5$ has a value greater than $x_2$.

13. The system of claim 12 wherein the warning transmitter performs warning cancellation control of the host vehicle in response to the entire body of the host vehicle moving out of the second region.

14. The system of claim 10, wherein the region detector detects, as a third region corresponding to the blind spot of the target vehicle, an internal region of a ninth line having a distance of $l/2$ at a rear, a tenth line having a distance of $x_6+l/2$ at the rear, an eleventh line having a distance of $x_7+w/2$ on a left, and a twelfth line having a distance of $x_7+w/2$ on a right, based on the reference point, wherein $x_6$ and $x_7$ have values greater than 0, and $x_6$ has a value less than $x_2$.

15. The system of claim 14, wherein the warning transmitter performs warning control of the host vehicle in response to the host vehicle entering the third region, and performs warning cancellation control of the host vehicle in response to the entire body of the host vehicle leaving the third region.

16. The method of claim 10, wherein the vehicle information calculator calculates the overall length and the overall width of the target vehicle based on a distance between the target vehicle included in the vehicle image and the host vehicle and a size of the target vehicle.

17. The method of claim 10, wherein
the vehicle information calculator converts the vehicle image into a top-view image and
calculates the overall length and the overall width of the target vehicle based on the top-view image.

\* \* \* \* \*